United States Patent

[11] 3,583,537

| [72] | Inventor | Hans Spannagel |
| | | Illingen Kr. Vaihingen, Germany |
| [21] | Appl. No. | 796,116 |
| [22] | Filed | Feb. 3, 1969 |
| [45] | Patented | June 8, 1971 |
| [73] | Assignee | Firma Dr. Ing. h.c.F. Porsche K.G. |
| | | Stuttgart-Zuffenhausen, Germany |
| [32] | Priority | Feb. 7, 1968 |
| [33] | | Germany |
| [31] | | P 16 75 227.5 |

[54] FRICTION DISC CLUTCH ASSEMBLY
4 Claims, 1 Drawing Fig.

[52] U.S. Cl.................................................... 192/70.13,
192/70.12, 192/70.27
[51] Int. Cl..................................................... F16d 13/46
[50] Field of Search............................................ 192/70.3-
—70.11

[56] References Cited
UNITED STATES PATENTS

| 1,910,084 | 5/1933 | Bixby ............................ | 192/70.13 |
| 2,259,933 | 10/1941 | Holloway ..................... | 192/70.13(X) |
| 2,770,341 | 11/1956 | Wobrock...................... | 192/70.12 |
| 2,974,660 | 3/1961 | Kolbe ........................... | 192/70.13(X) |
| 3,417,844 | 12/1968 | Zeidler......................... | 192/70.3 |

*Primary Examiner*—Allan D. Herrmann
*Attorney*—Craig, Antonelli, Stewart & Hill

ABSTRACT: A friction disc clutch, particularly for use in automotive vehicles, including a clutch housing enclosing a pressure plate and a friction disc and a friction plate, adjoining the clutch housing and being connected therewith, which friction plate serves as the flywheel mass and incorporates gear teeth about its outer periphery for engagement with a starter for an internal combustion engine, and an entrainment disc operatively connecting the friction plate with the engine crankshaft for rotation together therewith.

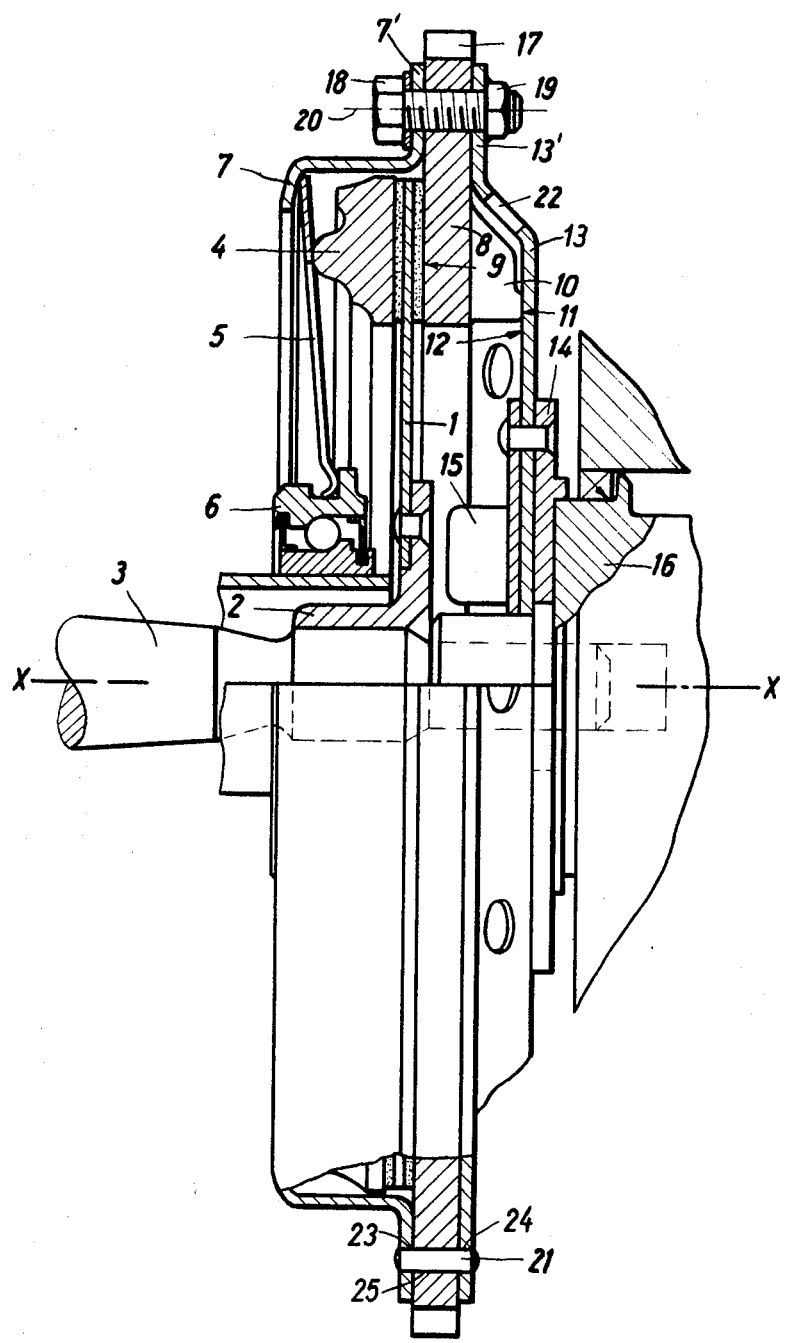

3,583,537

FRICTION DISC CLUTCH ASSEMBLY

BACKGROUND OF THE INVENTION

Friction disc clutches, currently widely used for automotive vehicles, are conventionally constructed with a pressure plate and a friction disc surrounded by a clutch housing. Further, a friction plate is commonly connected, in a nondetachable manner, with an entrainment disc which is in turn secured to the engine crankshaft by means of a flange connection. Finally, a starter ring gear, constructed as a separate structural member, is attached to the clutch housing.

Friction disc clutch assemblies of the type described above incorporate a number of inherent disadvantages, which the present invention seeks to eliminate or at least substantially reduce. First, a special starter ring gear, constructed as a separate structural entity, is required. The attachment of the starter ring gear to the clutch housing is particularly time consuming and expensive. Further, when the starter ring gear becomes damaged or worn, it is necessary to replace the entire clutch housing. Once assembled, it is impossible to disassemble the friction plate from the friction disc clutch assembly.

Accordingly, it is an object of the present invention to provide a friction disc clutch assembly incorporating a readily detachable friction plate.

Further, it is an object of the present invention to provide a friction disc clutch assembly including a starter ring gear incorporating within the assembly so that repairs or replacement of the ring gear can be effected simply and inexpensively. Finally, it is an object of the present invention to provide a friction disc clutch assembly which eliminates, or substantially reduces, the problems inherent in the devices of this type known heretofore.

SUMMARY OF THE INVENTION

The foregoing objects are accomplished, in accordance with the present invention, by providing gear teeth for engagement with a pinion of a starter for an internal combustion engine, spaced about the periphery of the friction plate, which plate is disposed between the clutch housing and an entrainment disc, secured for rotation together with the engine crankshaft. Constructed in this manner, a friction disc clutch assembly can be manufactured and assembled simply and inexpensively, with the friction plate member serving as the flywheel mass and incorporating the start ring gear for starting the internal combustion engine.

Preferably, the gear teeth are provided integrally about the periphery of the body of the friction plate. This feature further reduces manufacturing expenditures. The friction plate can be formed from steel, cast iron or an aluminum alloy. The starter gear teeth should be treated appropriately, by conventional methods, to increase the wear resistance thereof.

Friction surfaces are secured to one side of the friction plate; on the opposite surface of the friction plate, a plurality of ribs may be provided in the region of the inner circumference of the plate, which ribs extend radially with respect to the axis of rotation of the friction plate and abut one surface of the entrainment disc. These ribs enhance the structural rigidity of the friction plate and, simultaneous, cooperate with apertures in the entrainment disc to effect ventilation of the friction disc clutch assembly, thereby preventing localized overheating and burning of the friction plate.

It is further contemplated by the present invention that the friction disc clutch assembly be constructed so that the friction plate is attached to the clutch housing and/or to the entrainment disc in a plane between the starter gear teeth and the pressure plate. This configuration facilitates rapid replacement of the friction plate for purposes of repair.

BRIEF DESCRIPTION OF THE DRAWING

The foregoing objects, features and advantages of the present invention will become more readily apparent from the detailed description hereinbelow, when considered in conjunction with the accompanying drawing, wherein a friction disc clutch assembly, constructed in accordance with one embodiment of the present invention, is illustrated in a longitudinal view, partly in section.

DETAILED DESCRIPTION OF THE DRAWING

The friction disc clutch assembly, as illustrated in the drawing, includes a clutch disc 1, provided with friction linings, supported by hub portion 2 for fixed rotation with transmission shaft 3. A pressure plate 4, rotatable with and associated with clutch disc 1, is biased against the friction linings on clutch disc 1 by means of a disc-shaped cup spring 5. Spring 5 engages with the release bearing 6 at its inner circumferential surface and rests against the inner surface of a clutch housing 7 at its outer circumferential surface.

The clutch housing 7 surrounds pressure plate 4 and clutch disc 1 and includes a flange portion spaced radially outwardly thereof which is adapted for selectively connecting clutch housing 7 with a friction plate 8. Friction plate 8, preferably constructed of an aluminum alloy, includes a friction surface 9 on the side thereof facing clutch disc 1 for frictional engagement therewith. The opposite side of friction plate 8 includes a plurality of ribs 10 spaced annularly about the surface of friction plate 8 and extending radially with respect to the axis of rotation X-X of the friction disc clutch assembly. The forwardly disposed faces 11 of ribs 10 abut the inner surface 12 of an entrainment disc 13, which serves to establish a driving connection to the friction disc clutch assembly. Toward this end, entrainment disc 13 includes a flange 14 which is connected with the engine or crankshaft 16 by means of bolts 15 for rotation together therewith.

At its outer periphery, friction plate 8 incorporates gear teeth 17, spaced about the periphery of friction plate 8 for engagement with a pinion of a conventional starter (not shown) to effect starting of the internal combustion engine. Preferably, gear teeth 17 are treated, in a conventional manner, to enhance the wear resistance thereof.

In close proximity to gear teeth 17, friction plate 8 is detachably secured between the flange portion 7' of clutch housing 7 and a similar flange portion 13' provided on entrainment disc 13. For this purpose, bolts 18 may be inserted through aligned apertures spaced annularly about the flange portions of clutch housing 7 and entrainment disc 13, as well as the body of friction plate 8. Bolts 18 are retained in threaded engagement with nuts 19, which are firmly secured, as by welding, to the outer surface of entrainment disc 13. Spaced between individual bolts 18, a plurality of alignment pins 21 are inserted through a bore 25 in the body of friction plate 8 and through bores 23, 24 provided in the flange portions of clutch housing 7 and entrainment disc 13 in the annular plane 20 of the bolts 18.

In the region of ribs 10 of the friction plate 8, the entrainment disc 13 includes a number of apertures 22 spaced annularly about the surface thereof which cooperate with ribs 10 to effect ventilating of the friction disc clutch assembly upon rotation thereof.

In order to accomplish disassembly of the friction disc clutch assembly for purposes of repair and maintenance, it is merely necessary to removed bolts 18, thus rendering all of the component parts of the assembly readily accessible. In operation, disengagement of the driving connection is effected by depressing a clutch pedal (not shown) which shifts the release bearing 6 toward the left side in the drawing by means of a clutch-operating linkage (not shown). During this operation, the release bearing 6 likewise presses the cup spring 5 toward the left in opposition to the bias of the spring so as to remove pressure from plate 4 which is then disengaged from clutch disc 1. Thus, the friction surface 9 contacts the friction plate 8 without any pressure. In this position, the clutch is disengaged, and the connection between the crankshaft 16 and the transmission shaft 3 is interrupted, thereby making it possible to shift from one gear to another in the change speed gear (not shown).

The clutch is engaged upon release of the clutch pedal, whereby the release bearing 6 moves toward the right-hand side in the drawing. As a result, the spring 5 presses against the pressure plate 4 which, in turn, presses against the friction surface 9 of the clutch disc 1. The crankshaft 16 and the transmission shaft 3 are connected for rotation with each other when the clutch disc 1 is pressed against the friction 8.

While the present invention has been described in detail with reference to only a single specific embodiment, it is to be understood that the scope of the present invention is not limited thereto, but is susceptible of numerous changes and modifications as would be obvious to one with normal skill in the pertinent technology.

What I claim is:

1. A friction disc clutch assembly, particularly for an automotive vehicle having an internal combustion engine and a speed change transmission, comprising:

clutch disc means including friction surface means arranged for fixed rotation with a central transmission shaft, pressure plate means adapted for engagement with said friction surface means of said clutch disc means, clutch housing means of pressed sheet metal surrounding said clutch disc means and said pressure plate means, friction plate means operatively connected with a crank shaft of an internal combustion engine for rotation therewith and detachably connected with said clutch housing means, said friction plate means including gear means having gear teeth formed integrally with the body of said friction plate means and spaced about the periphery thereof for meshing engagement with a starter for effecting starting of said engine, said friction plate means being formed from an aluminum alloy material and said gear teeth being treated to enhance the wear resistance thereof, means for detachably connecting paid clutch housing means and said friction plate means in a circumferential plane positioned radially between the periphery of said pressure plate means and said gear teeth, entrainment disc means of pressed sheet metal connected for rotation with said crankshaft and being additionally detachably connected with said friction plate means, and said means for detachably connecting said clutch housing means and said friction plate means serve also to detachably connect said friction plate means and said entrainment disc means.

2. A friction disc clutch assembly according to claim 1, wherein said friction plate means further includes friction surface means on a side thereof facing said clutch disc means and a plurality of rib means spaced annularly about the opposite side of said friction plate means and extending radially with respect to the axis of rotation of said friction plate means, said rib means abutting an inner surface of said entrainment disc means, and wherein said entrainment disc means includes a plurality of apertures spaced annularly about the axis of rotation thereof in the region of contact thereof with said rib means of said friction plate means.

3. A friction disc clutch assembly according to claim 2, wherein said clutch housing means and said entrainment disc means each include radially extending flange means, each of said flange means and the body of said friction plate means being provided with a plurality of aligned, annularly spaced apertures.

4. A friction disc clutch assembly according to claim 3, wherein said means for connecting said clutch housing means and said friction plate means includes a plurality of threaded fasteners inserted within said aligned, annularly spaced apertures and nut means, secured to the outer surface of said entrainment disc means threaded engagement with said threaded fasteners and further including a plurality of alignment pins adapted for insertion in at least some of said aligned, annularly spaced apertures.